United States Patent [19]
Burgi et al.

[11] Patent Number: 6,019,389
[45] Date of Patent: Feb. 1, 2000

[54] AIR BAG INFLATOR

[75] Inventors: Anthony C. Burgi, Rochester; Mark Klann, Troy, both of Mich.

[73] Assignee: TRW Vehicle Safety Systems Inc., Lyndhurst, Ohio

[21] Appl. No.: 09/052,836

[22] Filed: Mar. 31, 1998

[51] Int. Cl.⁷ .................................................. B60R 21/26
[52] U.S. Cl. ........................................ 280/736; 280/741
[58] Field of Search ................................... 280/736, 741, 280/742, 737; 102/530, 531, 202.14; 222/3

[56] References Cited

U.S. PATENT DOCUMENTS

| | | | |
|---|---|---|---|
| 5,016,914 | 5/1991 | Faigle et al. | 280/741 |
| 5,558,367 | 9/1996 | Cuevas | 280/737 |
| 5,613,702 | 3/1997 | Goetz | 280/735 |
| 5,622,380 | 4/1997 | Khandhadia et al. | 280/736 |
| 5,628,528 | 5/1997 | DeSautelle et al. | 280/736 |
| 5,690,357 | 11/1997 | Cuevas | 280/737 |
| 5,794,973 | 8/1998 | O'Loughlin et al. | 280/737 |
| 5,803,494 | 9/1998 | Headley | 280/741 |
| 5,851,027 | 12/1998 | DiGeacamo et al. | 280/736 |

*Primary Examiner*—Christopher P. Ellis
*Attorney, Agent, or Firm*—Tarolli, Sundheim, Covell, Tummino & Szabo L.L.P.

[57] ABSTRACT

An apparatus (10) for inflating an inflatable vehicle occupant protection device (34) includes an inflation fluid source (12) actuatable to effect flow of inflation fluid (52) to inflate the inflatable device. The apparatus (10) includes a first actuatable initiator (50) for, when actuated, effecting actuation of the inflation fluid source (12) and creating a temperature rise. The apparatus (10) also includes a second actuatable initiator (50*a*) for, when actuated, effecting actuation of the inflation fluid source (12). The apparatus includes an igniter (72) for actuating the first initiator (50) to actuate the inflation fluid source (12), without actuating the second initiator (50*a*). The second initiator (50*a*) can be actuated in response to a rise in temperature resulting from actuation of the first actuatable initiator (50) and at a time delay after actuation of the first initiator. An ignitable material (80) ignites to actuate the second initiator (50*a*) at a predetermined temperature to which the ignitable material is exposed as a result of the rise in temperature.

14 Claims, 2 Drawing Sheets

AIR BAG INFLATOR

BACKGROUND OF THE INVENTION

1. Technical Field

The present invention relates to an inflator, and particularly relates to an inflator for an inflatable vehicle occupant protection device, such as an air bag.

2. Description of the Prior Art

An inflator for an inflatable vehicle occupant protection device, such as an air bag, includes a source of inflation fluid. The source of inflation fluid may be an ignitable material which, when ignited, rapidly generates a large volume of inflation fluid in the form of gas. The inflator may alternatively contain a stored quantity of pressurized inflation fluid, or a combination of pressurized inflation fluid and ignitable material for heating the inflation fluid.

The inflator typically includes an initiator which is actuated electrically when the air bag is to be inflated. The initiator typically includes an ignitable or pyrotechnic material. Actuation of the initiator effects flow of inflation fluid from the inflator into the air bag to inflate the air bag.

Some inflators are of the "dual stage" type and include two independently actuatable initiators. The two initiators can be energized simultaneously, or at different times, to control the rate of flow of inflation fluid from the inflator. In some cases, only one of the initiators is energized, for example, when a relatively low fluid flow rate is desired. In these cases, any ignitable material in the second initiator remains active, that is, unignited. It is desirable, for safety reasons, to deactivate the ignitable material in the second initiator when the second initiator is not electrically energized.

SUMMARY OF THE INVENTION

The present invention is an apparatus for inflating an inflatable vehicle occupant protection device. The apparatus comprises an inflation fluid source actuatable to effect flow of inflation fluid to inflate the inflatable device. The apparatus also comprises a first actuatable initiator for, when actuated, effecting actuation of the inflation fluid source and creating a temperature rise. The apparatus further comprises a second actuatable initiator for, when actuated, effecting actuation of the inflation fluid source. The apparatus includes means for actuating the first initiator to actuate the inflation fluid source, without actuating the second initiator. The apparatus further includes means for actuating the second initiator in response to a rise in temperature resulting from actuation of the first actuatable initiator and at a time delay after actuation of the first initiator. The means for actuating the second initiator comprises an ignitable material which ignites to actuate the second initiator at a predetermined temperature to which the ignitable material is exposed as a result of the rise in temperature.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
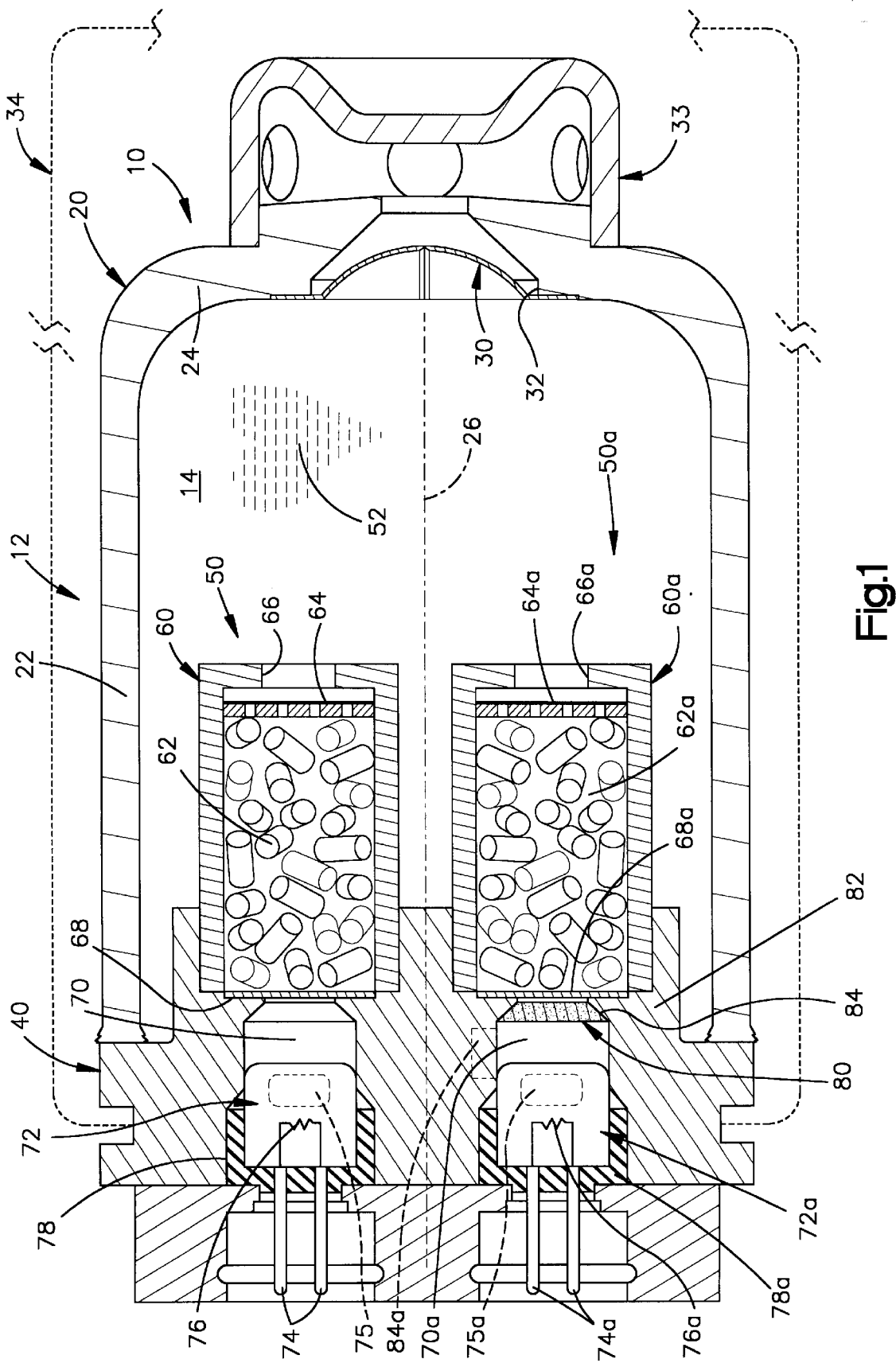
FIG. 1 is a sectional view of an air bag inflator constructed in accordance with a first embodiment of the present invention.

The present invention relates to an inflator, and particularly relates to an inflator for an inflatable vehicle occupant protection device, such as an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. The present invention is applicable to various inflator constructions. As representative of the present invention, FIG. 1 illustrates an air bag inflator 10.

The inflator 10 includes a container 12 which defines a gas storage chamber 14. The container 12 has a main body portion 20. The main body portion 20 of the container 12 has a generally cylindrical configuration including a cylindrical, axially extending side wall 22 and a generally radially extending end wall 24. The side wall 22 of the container 12 is centered on a longitudinal central axis 26 of the inflator 10.

A primary burst disk 30 closes an opening 32 in the end wall 24 of the container 12. A diffuser 33 is secured to the end wall 24 outside the primary burst disk 30. The diffuser 33 is in fluid communication with an inflatable vehicle occupant protection device in the form of an air bag indicated schematically at 34.

The container 12 also includes a bulkhead 40. The bulkhead 40 is welded to the side wall 22 of the container 12 at the end of the container opposite the primary burst disk 30. The bulkhead 40, together with first and second actuatable initiator assemblies or initiators 50 and 50a described below, closes the end of the container 12 opposite the primary burst disk 30.

A quantity of inflation fluid 52 is disposed in the storage chamber 14. The inflation fluid 52 preferably comprises an inert gas, such as argon under pressure. The fluid 52 is stored at a pressure in the range of about 1,500 psig to about 6,000 psig.

The inflation fluid 52 may alternatively comprise a combustible mixture of gases including a primary gas and a fuel gas. The primary gas comprises the majority of the inflation fluid that inflates the air bag. The fuel gas, when ignited, heats the primary gas to increase the pressure and temperature of the fluid in the chamber.

The first initiator 50, or primary initiator, includes a generant housing 60 secured to the bulkhead 40. The generant housing 60 extends into the chamber 14. The first initiator 50 also includes a quantity of a known gas generant material 62 disposed in the generant housing 60. A filter plate and seal assembly 64 extends across an opening 66 in one end of the generant housing 60. A burst disk 68 secured to the bulkhead 40 extends across and closes the opposite end of the generant housing 60.

The bulkhead 40 defines a first igniter chamber 70. The first igniter chamber 70 is disposed adjacent to the burst disk 68 and, thus, adjacent to the generant 62. The first initiator 50 includes an electrically energizable first igniter 72 which is located in the first igniter chamber 70. The first igniter 72 is a known device such as a pyrotechnic squib which, when energized, produces combustion products for igniting the generant 62 and, thus, actuating the first initiator.

The first igniter 72 includes a pair of electrical terminals 74 for receiving an electric energizing current to energize the first igniter. The first igniter 72 also includes a pyrotechnic enhancer material 75 which is ignited by a resistive element 76 in the first igniter connected between the electrical terminals 72. An igniter seal 78 secures the first igniter 72 in the first igniter chamber 70 in the bulkhead 40.

The second initiator 50a is identical in construction to the first initiator 50. Parts of the second initiator 50a are given the same reference numerals as corresponding parts of the first initiator 50, with the suffix "a" added to distinguish them. Because the second initiator 50 is identical in construction to the first initiator 50, the parts of the second initiator are not described in detail.

A body of ignitable material 80 is disposed in the second igniter chamber 70a. The body of ignitable material 80 is disposed adjacent to the second igniter 72a, at a location between the second igniter and the second burst disc 68a. A wall portion 82 of the bulkhead 40 separates the gas storage chamber 14 from the said second igniter chamber 70a. The body of ignitable material 80 is disposed in a recess 84 in the wall portion 82.

The body of ignitable material comprises a material which autoignites at a lower temperature than the generant 62a. The body of ignitable material 80 is preferably a packet of a known autoignition material (AIM) which autoignites when exposed to a predetermined temperature of about 150° C.; the generant materials 62 and 62a are preferably of a composition which ignites at a temperature of about 230° C. to about 250° C. Other materials and ignition temperatures are, or course, suitable, so long as the body of ignitable material 80 autoignites at a lower temperature than the generant 62 and 62a.

The terminals 74 of the first igniter 72 are connected with vehicle electric circuitry (not shown) including a power source, which is preferably a vehicle battery and/or a capacitor, and a normally open switch. The switch is part of a sensor which senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag or other vehicle occupant protection device is desired to help protect an occupant of the vehicle.

When the sensor senses a collision-indicating condition at or above the predetermined threshold level, the switch closes and the first igniter 72 is energized electrically to actuate the first initiator 50. The first igniter 72 produces hot combustion products which fill the first igniter chamber 70 and rupture the first burst disc 68. The combustion products of the first igniter 72 ignite the generant 62, thus actuating the first initiator. The ignition of the generant 62 results in heating of the gas 52 in the chamber 14, causing an increase in the pressure in the chamber.

The primary burst disc 30 ruptures because of the pressure increase in the chamber 14. Substantially all the inflation fluid 52 flows out of the chamber 14, through the opening 32 in the container end wall 24. The inflation fluid 52 is directed by the diffuser 33 into the air bag 34 to inflate the air bag. The air bag 34 is inflated in a time period of about 5 milliseconds to about 50 milliseconds. After about 50 milliseconds after energization of the first igniter 72, the fluid pressure in the chamber 14 is down to a very low level.

Depending on the sensed vehicle conditions, the vehicle electric circuitry might electrically energize the second igniter 72a as well as the first igniter 72, either at the same time as the first igniter or shortly thereafter. If the second igniter 72a is electrically energized, its combustion products ignite the second generant 62a, thus actuating the second initiator and further increasing the temperature and pressure of the inflation fluid 52 in the chamber 14.

The heat generated by the first initiator 50 itself is not sufficient to directly ignite any portion of the second initiator 50a; nor is the heat generated by the resulting heating of the gas 52 sufficient to directly ignite any portion of the second initiator including the second generant 62a. Therefore, since it is desired to actuate the second initiator 50a in this circumstance, the inflator 10 is configured to ignite the autoignition material.

Specifically, the ignition of the first generant a 62 and the heating of the gas 52 in the chamber 14 create a significant rise in temperature in the chamber. Heat from the chamber 14 is conducted (soaks) into the parts of the inflator 10 adjacent to the chamber 14, including the AIM packet 80 and the bulkhead 40. The amount of heat which reaches the AIM packet 80, as a result of the ignition of the first generant 62 and the heating of the gas 52, is sufficient to cause ignition of the AIM packet.

The ignition of the AIM packet 80 results in ignition of the enhancer material 75a in the second igniter 72a. The ignition of the enhancer material 75a in the second igniter 72a creates combustion products sufficient to rupture the second burst disk 68a and ignite the second generant 62a, thus actuating the second initiator. As a result, the second generant 62a is no longer active.

The ignition of the AIM packet 80 does not occur immediately after actuation of the first initiator 50. Instead, it takes about 50 milliseconds, or longer, for sufficient heat to be conducted to the AIM packet 80 to ignite the AIM packet. As a result, when the AIM packet 80 ignites and the second initiator 50a is actuated, the fluid pressure in the chamber 14 is already low enough that ignition of the second generant 62a does not result in any significant additional fluid output from the inflator 10. Thus, the vehicle occupant is not affected.

The AIM packet 80 can, alternatively, be placed at another location in the inflator 10, such as the recess 84a indicated schematically in FIG. 1. The location of the AIM packet 80 is selected so that the second initiator 50a is actuated when the AIM packet ignites. It should be understood that the AIM packet 80 may be located so that autoignition of the AIM packet directly causes ignition of the second generant 62a rather than ignition of the enhancer material 74a in the second igniter 72a.

Figure 2:
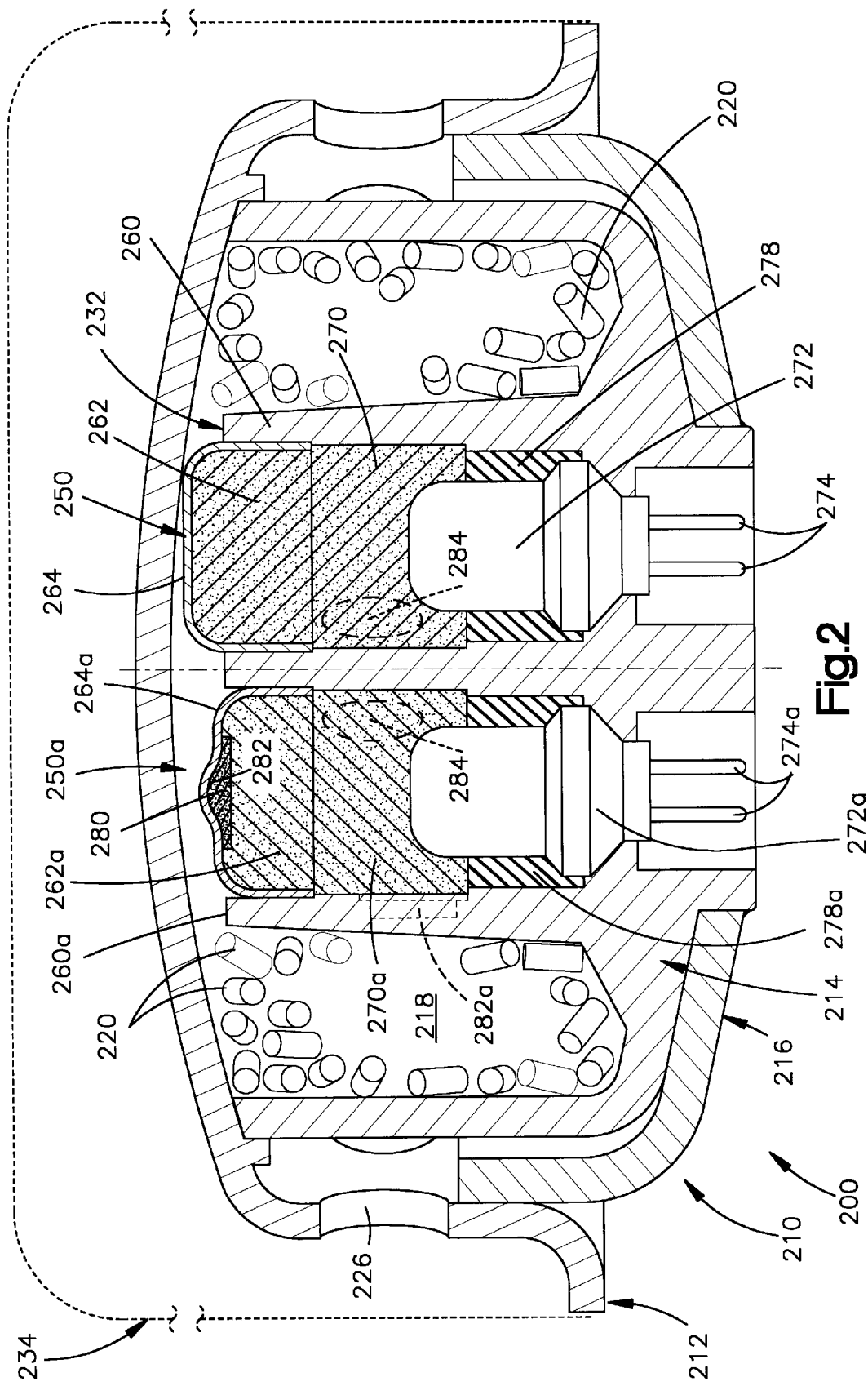
FIG. 2 is a sectional view of an air bag inflator constructed in accordance with a second embodiment of the present invention.

FIG. 2 illustrates an air bag inflator 200 constructed in accordance with a second embodiment of the present invention. The inflator 200 uses the combustion of a solid pyrotechnic material to produce inflation fluid; no gas is stored in the inflator for use as inflation fluid.

The inflator 200 includes a housing 210. The housing 210 includes a diffuser cup 212, a combustor cup 214, and a closure 216, each made from a metal such as aluminum. The combustor cup 214 defines an annular combustion chamber 218. A quantity of solid pyrotechnic material or propellant 220, such as sodium azide, is disposed in the combustion chamber 218. The combustion chamber 218 communicates through combustion outlets (not shown) with a plurality of gas outlets 226 in the diffuser cup 212. The solid propellant 220 is ignitable to produce inflation fluid under pressure for inflating the air bag 234.

The combustion chamber 218 extends around a central portion 232 of the combustor cup 214 which encloses first and second initiator assemblies or initiators 250 and 250a.

The first initiator 250, or primary initiator, includes a generant housing 260 formed as part of the central portion 232 of the combustor cup. The generant housing 260 defines a first initiator chamber 270 within the combustion chamber 218. The first initiator 250 also includes a quantity of a known enhancer material 262 disposed in the generant housing 260. A sheet metal cap 264 extends across and closes the open end of the first initiator chamber 270.

The first initiator 250 includes an electrically energizable first igniter 272 which is located in the first initiator chamber 270. The first igniter 272 is a known device, such as a pyrotechnic squib, which when energized produces combustion products for igniting the enhancer material 262, thus actuating the first initiator. The first igniter 272 may be of the same type of construction as the igniters 72 and 72a in the inflator 10 (FIG. 1). An igniter seal 278 secures the first igniter 272 in the first initiator chamber 270.

The second initiator 250a is similar in construction to the first initiator 250. Parts of the second initiator 250a are given the same reference numerals as corresponding parts of the first initiator 250, with the suffix "a" added to distinguish them. Because the second initiator 250a is identical in construction to the first initiator 250, the parts of the second initiator are not described in detail.

A body of ignitable material (AIM packet) 280 is disposed in the second initiator chamber 270a. The body of ignitable material 280 is disposed adjacent to the enhancer material 262a, at a location inside the cap 264a. The AIM packet 280 is disposed in a recess 282 in the cap 264a. The AIM packet 280 preferably comprises an auto-ignitable material having the same composition as the ignitable material 80 in the inflator 10 (FIG. 1).

The terminals 274 and 274a of the igniters 272 and 272a, respectively, are connected with vehicle electric circuitry (not shown) in the manner described above with reference to FIG. 1. When the first igniter 272 is energized electrically, it produces hot combustion products which ignite the enhancer material 262, thus actuating the first initiator 250. Hot combustion products flow out of initiator outlets 284 into the combustion chamber 218. The propellant 220 in the combustion chamber 218 ignites, producing inflation fluid at a high pressure which is directed by the diffuser cup 212 into the air bag 234 to inflate the air bag. The air bag 234 is inflated in a time period of about 5 milliseconds to about 50 milliseconds.

If the second igniter 272a is not energized by the vehicle electric circuitry, then the second initiator 250a is not thereby actuated. The enhancer material 262a remains active and subject to ignition. However, the ignition of the propellant 220 in the chamber 218 creates a significant rise in temperature in the chamber. Heat from the chamber 218 is conducted into the parts of the inflator 200 surrounding the chamber, including the AIM packet 280.

The amount of heat which reaches the AIM packet 280 is sufficient to cause ignition of the AIM packet. The ignition of the AIM packet 280 results in ignition of the generant 262a in the second initiator 250a. As a result, the second initiator 250a is actuated and is no longer active.

The ignition of the AIM packet 280 occurs about 50 milliseconds, or longer, after energization of the first initiator 250. As a result, when the AIM packet 280 ignites and the second initiator 250a is actuated, the fluid pressure in the chamber 218 is already so low that there is no significant additional fluid output from the inflator 200. Thus, the vehicle occupant is not affected.

The AIM packet 280 can, alternatively, be placed at another location in the inflator 200, such as the recess 282a indicated schematically in FIG. 2 in the generant housing 260a. The AIM packet 280 is located near enough to the second initiator 250a so that the second initiator is actuated when the AIM packet ignites.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant protection device, said apparatus comprising:
    an inflation fluid source actuatable to effect flow of inflation fluid to inflate the inflatable device;
    a first actuatable initiator for, when energized, effecting actuation of said inflation fluid source and creating a temperature rise;
    a second actuatable initiator for, when energized, effecting actuation of said inflation fluid source;
    means for energizing said first initiator to actuate said inflation fluid source, without energizing said second initiator; and
    means for energizing said second initiator in response to a rise in temperature resulting from energization of said first actuatable initiator and at a time delay after energization of said first initiator, said means for energizing said second initiator comprising an ignitable material which ignites to energize said second initiator at a predetermined temperature to which said ignitable material is exposed as a result of said rise in temperature.

2. An apparatus as set forth in claim 1 wherein said second actuatable initiator comprises an electrically energizable member and a body of pyrotechnic material which is ignitable by said member upon electric energization of said member, said ignitable material being disposed sufficiently close to said pyrotechnic material so that ignition of said ignitable material results in ignition of said pyrotechnic material in said second actuatable initiator.

3. An apparatus as set forth in claim 1 wherein said inflation fluid source comprises a quantity of gas stored under pressure in a chamber and releasable from said chamber in response to energization of said first actuatable initiator for inflating the inflatable device.

4. An apparatus as set forth in claim 1 wherein said inflation fluid source comprises a solid propellant which is ignitable to produce inflation fluid under pressure for inflating the inflatable device.

5. An apparatus as set forth in claim 1 wherein said means for energizing energizes said second initiator at a time delay of about 50 milliseconds or longer after energization of said first initiator.

6. An apparatus as set forth in claim 1 wherein said apparatus comprises a main chamber in which said inflation fluid source is disposed, a first initiator chamber in which said first initiator is disposed, and a second initiator chamber in which said second initiator and said ignitable material are disposed.

7. An apparatus as set forth in claim 1 wherein said apparatus comprises a main chamber in which said inflation fluid source is disposed, a first initiator chamber in which said first initiator is disposed, and a second initiator chamber in which said second initiator is disposed, said apparatus comprising a wall separating said main chamber from said second initiator chamber, said ignitable material being disposed in a recess in said wall.

8. An apparatus as set forth in claim 1 wherein said ignitable material has an autoignition temperature which is less than the ignition temperature of said second initiator.

9. An apparatus as set forth in claim 1 wherein said ignitable material has an autoignition temperature of about 150° C.

10. An apparatus as set forth in claim 1 wherein said second actuatable initiator comprises an electrically energizable member and a body of pyrotechnic material which is ignitable by said member upon electric energization of said member, said ignitable material being disposed sufficiently close to said pyrotechnic material so that ignition of said ignitable material results in ignition of said pyrotechnic material in said second actuatable initiator; and wherein said means for energizing energizes said second initiator at a time delay of about 50 milliseconds or longer after energization of said first initiator.

11. An apparatus as set forth in claim 10 wherein said apparatus comprises a main chamber in which said inflation fluid source is disposed, a first initiator chamber in which said first initiator is disposed, and a second initiator chamber in which said second initiator is disposed, said apparatus comprising a wall separating said main chamber from said second initiator chamber, said ignitable material being disposed in a recess in said wall.

12. An apparatus as set forth in claim 10 wherein said ignitable material has an autoignition temperature which is less than the ignition temperature of said second initiator.

13. An apparatus as set forth in claim 12 wherein said inflation fluid source comprises a quantity of gas stored under pressure in a chamber and releasable from said chamber in response to energization of said first actuatable initiator for inflating the inflatable device.

14. An apparatus as set forth in claim 12 wherein said inflation fluid source comprises a solid propellant which is ignitable to produce inflation fluid under pressure for inflating the inflatable device.

* * * * *